US011330421B2

United States Patent
Sevindik et al.

(10) Patent No.: US 11,330,421 B2
(45) Date of Patent: May 10, 2022

(54) DUAL SUBSCRIBER IDENTIFICATION MODULE (SIM) CUSTOMER PREMISES EQUIPMENT (CPE) FOR WIRELESS NETWORK POWER MEASUREMENTS

(71) Applicant: Charter Communications Operating, LLC, St. Louis, MO (US)

(72) Inventors: Volkan Sevindik, Parker, CO (US); Haider Syed, Parker, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 16/807,054

(22) Filed: Mar. 2, 2020

(65) Prior Publication Data

US 2021/0274339 A1    Sep. 2, 2021

(51) Int. Cl.
| | | |
|---|---|---|
| *H04W 8/18* | (2009.01) | |
| *H04W 8/20* | (2009.01) | |
| *H04B 17/318* | (2015.01) | |
| *H04W 24/08* | (2009.01) | |
| *H04W 24/10* | (2009.01) | |
| *H04W 60/00* | (2009.01) | |

(52) U.S. Cl.
CPC .......... *H04W 8/183* (2013.01); *H04B 17/318* (2015.01); *H04W 8/20* (2013.01); *H04W 24/08* (2013.01); *H04W 24/10* (2013.01); *H04W 60/00* (2013.01)

(58) Field of Classification Search
CPC ....... H04W 8/183; H04W 8/20; H04W 24/08; H04W 24/10; H04W 60/00; H04B 17/318

USPC .......................................................... 370/329
See application file for complete search history.

(56) References Cited

U.S. PATENT DOCUMENTS

| | | |
|---|---|---|
| 8,200,212 B2 | 6/2012 | Rappaport et al. |
| 8,897,702 B2 | 11/2014 | Niu et al. |
| 9,826,570 B1 | 11/2017 | Gupta et al. |
| 9,854,004 B2 | 12/2017 | Bharadwaj |
| 10,492,204 B2 | 11/2019 | Kakinada et al. |

(Continued)

FOREIGN PATENT DOCUMENTS

| | | | |
|---|---|---|---|
| WO | WO2017136959 A1 | 8/2017 | |
| WO | WO 2020/070716 | * 10/2018 | ............ H04W 16/14 |
| WO | 2020070716 A1 | 4/2020 | |

OTHER PUBLICATIONS

Authorized Officer Harry C. Kim PCT Application PCT/US2020/055963 International Search Report and Written Opinion of the ISA, 8 Pages Total, dated Dec. 21, 2020.

(Continued)

*Primary Examiner* — Mong-Thuy T Tran

(74) *Attorney, Agent, or Firm* — Otterstedt, Wallace & Kammer, LLP

(57) ABSTRACT

Methods, apparatus, and systems for monitoring a network. A customer premise equipment device is registered with a spectrum access system. The spectrum access system is informed of a count of subscriber identification module (SIM) cards and a count of radios in the customer premise equipment device and is informed of a frequency and an identity of the network to monitor. One or more measurements are performed by the customer premise equipment device based on the frequency and the identity of the network and the one or more measurements are sent to a managing server.

26 Claims, 7 Drawing Sheets

(56) References Cited

U.S. PATENT DOCUMENTS

| | | |
|---|---|---|
| 10,623,943 B1 | 4/2020 | Sevindik |
| 10,708,857 B2 | 7/2020 | Dhillon et al. |
| 11,019,563 B1 | 5/2021 | Sevindik et al. |
| 2004/0090971 A1 | 5/2004 | Anderson, IV |
| 2008/0155589 A1 | 6/2008 | McKinnon et al. |
| 2009/0187480 A1 | 7/2009 | Bernard et al. |
| 2011/0264530 A1 | 10/2011 | Santangelo et al. |
| 2013/0182697 A1* | 7/2013 | Tuominen ............ G01S 5/0242 370/338 |
| 2015/0223090 A1* | 8/2015 | Van Lieshout ....... H04W 24/08 370/252 |
| 2015/0295692 A1 | 10/2015 | Gowda et al. |
| 2015/0373554 A1* | 12/2015 | Freda .................... H04L 5/0073 455/450 |
| 2016/0135213 A1 | 5/2016 | Zhu et al. |
| 2017/0127305 A1* | 5/2017 | Dev ....................... H04W 24/10 |
| 2017/0134994 A1 | 5/2017 | Chinthalapudi et al. |
| 2017/0181071 A1* | 6/2017 | Lipka ..................... H04W 48/18 |
| 2018/0026903 A1 | 1/2018 | Kotreka et al. |
| 2018/0027567 A1 | 1/2018 | Saghir et al. |
| 2018/0097585 A1 | 4/2018 | Dev et al. |
| 2018/0270649 A1 | 9/2018 | Tsai et al. |
| 2019/0045397 A1* | 2/2019 | Mueck .................. H04W 88/06 |
| 2019/0058999 A1 | 2/2019 | Gunasekara et al. |
| 2019/0069004 A1 | 2/2019 | Badawiyeh |
| 2019/0069224 A1 | 2/2019 | Lee et al. |
| 2019/0082446 A1 | 3/2019 | Guo et al. |
| 2019/0090309 A1 | 3/2019 | Wong et al. |
| 2019/0115950 A1 | 4/2019 | Kakinada et al. |
| 2019/0116239 A1 | 4/2019 | Jagannath et al. |
| 2019/0150134 A1 | 5/2019 | Kakinada et al. |
| 2019/0223025 A1 | 7/2019 | Kakinada et al. |
| 2019/0230500 A1* | 7/2019 | Goncalves ............ H04W 36/14 |
| 2019/0294829 A1 | 9/2019 | Zhou |
| 2019/0364565 A1 | 11/2019 | Hmimy et al. |
| 2019/0372689 A1 | 12/2019 | Carter et al. |
| 2020/0008007 A1* | 1/2020 | Belghoul .............. H04W 24/08 |
| 2020/0008143 A1* | 1/2020 | Jain ....................... H04W 8/183 |
| 2020/0008196 A1 | 1/2020 | Low et al. |
| 2020/0037211 A1* | 1/2020 | Hinc ................. H04W 36/0058 |
| 2020/0068647 A1 | 2/2020 | Jha et al. |
| 2020/0100098 A1 | 3/2020 | Bai et al. |
| 2020/0107293 A1 | 4/2020 | Cui et al. |
| 2020/0112851 A1 | 4/2020 | Wane |
| 2020/0146032 A1 | 5/2020 | Bae et al. |
| 2020/0169858 A1* | 5/2020 | Hu .......................... H04W 8/24 |
| 2020/0329523 A1* | 10/2020 | Yi ...................... H04W 72/0453 |
| 2021/0117368 A1 | 4/2021 | Sevindik et al. |

OTHER PUBLICATIONS

Daoud et al., "On The Performance of CBRS Fixed Wireless Access: Coverage and Capacity Field Study", Sep. 2019, 41 pages, https://www.nctatechnicalpapers.com/Paper/2019/2019-on-the-performance-of-cbrs-fixed-wireless-access.

3rd Generation Partnership Project (3GPP), Technical Specification (TS) Group Services and System Aspects, "General Packet Radio Service (GPRS) enhancements for Evolved Universal Terrestrial Radio Access Network (E-UTRAN) access", TS 23.401 V16.5.0, Dec. 2019, 423 pages, http://www.3gpp.org/ftp//Specs/archive/23_series/23.401/23401-g30.zip.

The Software Defined Radio Forum Inc., Spectrum Sharing Committee Work Group 1 (WG1), "CBRS Operational and Functional Requirements", WINNF-TS-0112-V1.9.0, Dec. 2019, 81 pages, https://winnf.memberclicks.net/assets/CBRS/WINNF-TS-0112.pdf.

CBRS Alliance, "CBRS Network Services Use Cases and Requirements", CBRSA-TS-1001 V2.0.0, Dec. 2018, 37 pages, https://www.cbrsalliance.org/wp-content/uploads/2018/12/CBRSA-TS-1001-V2.0.0_Published-December-112c-2018.pdf.

CBRS Alliance, "CBRS Network Services Stage 2 and 3 Specification", CBRSA-TS-1002 V2.0.0, Feb. 2019, 52 pages, https://www.cbrsalliance.org/wp-content/uploads/2019/04/CBRSA-TS-1002-V2.0.0_Published-April-5-2019.pdf.

Volkan Sevindik et al., unpublished U.S. Appl. No. 16/777,751, filed Jan. 30, 2020, Data Transfer Using a Dual SIM Phone pp. 1-31 and 10 sheets drawings.

Fierce Wireless, Charter's MVNO counts 21,000 lines as executives hint at eSIM plans a . . . , Oct. 26, 2018, pp. 1-5, https://www.fiercewireless.com/wireless/charter-s-mvno-counts-21-000-l . . . .

Fierce Wireless, Charter updates MVNO progress, explores dual SIM connectivity, May 1, 2019, pp. 1-4, https://www.fiercewireless.com/wireless/charter-updates-mvno-progress . . . .

The Wireless Innovation Forum, Copyright 2018, Acronyms and Definitions Pertaining to Commercial Operations in the U.S. 3550-3700 MHz Band, pp. 1-10.

Wikipedia, "Phablet," last edited on Nov. 3, 2019, pp. 1-14, https://en.wikipedia.org/wiki/Phablet.

Wikipedia, "Dual SIM," last edited on Nov. 6, 2019, pp. 1-6, https://en.wikipedia.org/wiki/Dual_SIM.

OnQ Blog, Multi-SIM smartphones to enhance your 5G experience, Nov. 18, 2019, https://www.qualcomm.com/news/onq/2019/11/18/multi-sim-smartphones-enhance-your-5g-experience, pp. 1-7.

Android Central, What is dual 4G LTE, and why should you care? 3 Pages, Downloaded From https://www.androidcentral.com/what-dual-4g-lte-and-why-should-you-care, Dated Jul. 5, 2018.

Mediatek, Dual SIM, Dual 4G VoLTE Smartphones, https://www.mediatek.com/features/dual-4g-volte, 3 Pages, Downloaded Sep. 17, 2019.

Official Android Blog: Android 5.1: Unwrapping a new Lollipop update, pp. 1-3, Dated Mar. 9, 2015, https://android.googleblog.com/2015/03/android-51-unwrapping-new-lollipop.html.

Verizon Wireless, Apple® iPhone®—Turn Voice & Data On / Off—HD Voice, https://www.verizonwireless.com/support/knowledge-base-206984/, 3 Pages, Downloaded Sep. 17, 2019.

* cited by examiner

DUAL SUBSCRIBER IDENTIFICATION MODULE (SIM) CUSTOMER PREMISES EQUIPMENT (CPE) FOR WIRELESS NETWORK POWER MEASUREMENTS

FIELD OF THE INVENTION

The present invention relates generally to the electrical, electronic, and computer arts, and more particularly relates to wireless telephony and networking.

BACKGROUND OF THE INVENTION

Wireless telecommunications or radio access technologies (RATs) generally use licensed radio frequency spectrum for communications between mobile devices and wireless telecommunications networks. For example, licensed spectrum and unlicensed spectrum may be used for third generation (3G) and fourth generation (4G) wireless communications.

Citizens Broadband Radio Service (CBRS) spectrum is a type of unlicensed spectrum or shared spectrum which is shared between multiple entities including government users (such as the military), licensed users, and non-licensed users. CBRS is a multi-tiered wireless band between 3.550 MHz and 3.700 MHz. In particular, CBRS is a three-tiered access framework including incumbent users (i.e., federal, military, and the like), priority access users (winning auction bidders), and general authorized access users, where the general users are permitted to use any portion of the CBRS spectrum not assigned to a higher tier user and may also operate opportunistically on unused priority access spectrum. Availability of the CBRS spectrum dynamically changes depending on use by higher priority entities. Higher tier users are protected from lower tier users using a centralized spectrum access system (SAS), which may be a federal or commercial entity. The SAS authorizes or grants spectrum to access points known as CBRS Devices (CBSDs) and performs interference management to protect higher tier users. This protection may include, for example, dropping CBSDs which are general authorized access users. In summary, CBRS is an interference-limited network, which means that the performance of the network and the data sent to CBRS subscribers is limited by the amount of interference the CBRS users or subscribers experience in the frequency band of operation.

Customer premises equipment (CPE) devices are often utilized to provide network connectivity between devices in a residence and various providers, such as wireless carriers, service providers, multiple systems operator (MSO), and the like. The CPE device may include a subscriber identification module (SIM) to connect to a network including a network of a wireless carrier, cable television (CATV) provider, Internet service provider (ISP), and the like. Processors in the CPE device may perform various tasks related to the network in addition to providing radio resource management tasks.

SUMMARY OF THE INVENTION

Techniques are provided for a dual subscriber identification module (SIM) customer premises equipment (CPE) for wireless network power measurements (more than two SIMs are possible in some embodiments).

In one aspect, an exemplary method includes the operations of registering a customer premise equipment device with a spectrum access system; informing the spectrum access system of a count of subscriber identification module (SIM) cards and a count of radios in the customer premise equipment device; informing the spectrum access system of a frequency and an identity of the network to monitor; performing, by the customer premise equipment device, one or more measurements based on the frequency and the identity of the network; and sending the one or more measurements to a managing server.

In one aspect, a customer premise equipment device comprises a first subscriber identification module (SIM) and a second subscriber identification module (SIM); a memory; and at least one processor coupled to said memory and in data communication with said first subscriber identification module (SIM), and said second subscriber identification module (SIM); wherein said at least one processor coupled to said memory, said first subscriber identification module (SIM), and said second subscriber identification module (SIM) are cooperatively configured to perform operations comprising: registering the customer premise equipment device with a spectrum access system; informing the spectrum access system of a count of subscriber identification module (SIM) cards and a count of radios in the customer premise equipment device; informing the spectrum access system of a frequency and an identity of the network to monitor; performing, by the customer premise equipment device, one or more measurements based on the frequency and the identity of the network; and sending the one or more measurements to a managing server.

In one aspect, a system comprises a licensed spectrum network configured to provide wireless coverage; one or more base stations configured to wirelessly communicate with the licensed spectrum network; a citizens broadband radio service network; a spectrum access system; a customer premise equipment device configured to wirelessly communicate with the licensed spectrum network and configured to communicate with the citizens broadband radio service network, the customer premise equipment device comprising a first subscriber identification module (SIM) and a second subscriber identification module (SIM); a memory; and at least one processor coupled to the memory and in data communication with the first subscriber identification module (SIM), and the second subscriber identification module (SIM); wherein the at least one processor coupled to the memory, the first subscriber identification module (SIM), and the second subscriber identification module (SIM) are cooperatively configured to perform operations comprising registering the customer premise equipment device with the spectrum access system; informing the spectrum access system of a count of subscriber identification module (SIM) cards and a count of radios in the customer premise equipment device; informing the spectrum access system of a frequency and an identity of the licensed spectrum network to monitor; performing one or more measurements based on the frequency and the identity of the licensed spectrum network; and sending the one or more measurements to a managing server.

In one aspect, a non-transitory computer readable medium comprises computer executable instructions which when executed by a computer cause the computer to perform operations comprising registering the customer premise equipment device with a spectrum access system; informing the spectrum access system of a count of subscriber identification module (SIM) cards and a count of radios in the customer premise equipment device; informing the spectrum access system of a frequency and an identity of the network to monitor; performing, by the customer premise equipment device, one or more measurements based on the frequency and the identity of the network; and sending the one or more measurements to a managing server.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., a multi-SIM device) including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software and/or firmware module(s) stored in a tangible computer-readable recordable storage medium (or multiple such media) and implemented on a hardware processor, or (iii) a combination of (i) and (ii); any of (i)-(iii) implement the specific techniques set forth herein. The means do not include a transmission medium per se or a disembodied signal per se.

Techniques of the present invention can provide substantial beneficial technical effects. For example, one or more embodiments provide one or more of:

monitoring a plurality of networks using multiple SIMs;

selection of a network in consideration of signal quality and power measurements;

increased quality of service and quality of user experience for subscribers; and increased data bandwidth by selecting the network based on signal quality.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
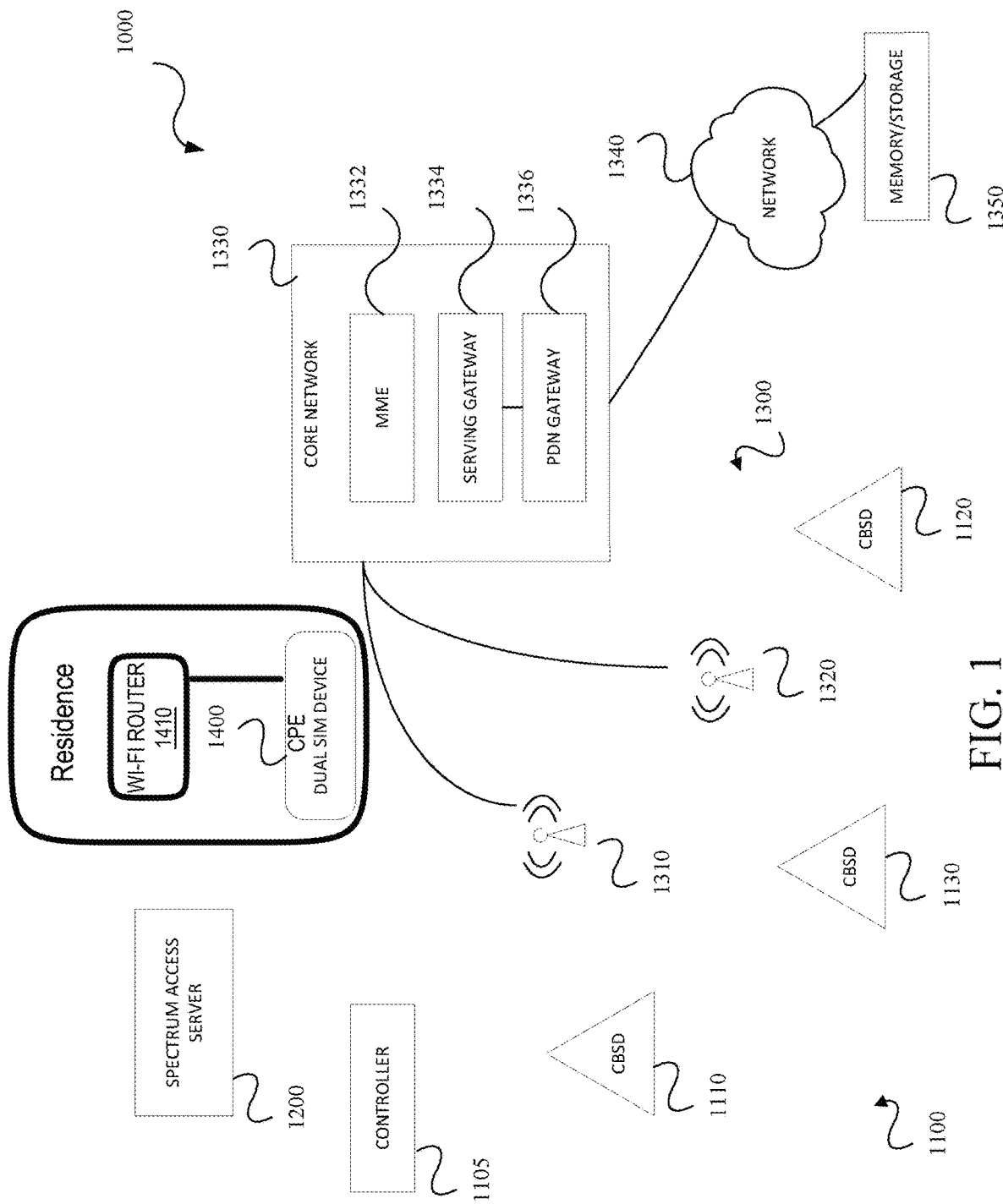
FIG. 1 is a diagram of an example citizens broadband radio service (CBRS) network and a customer premise equipment (CPE) device with multiple subscriber identification module (SIM) devices, in accordance with an example embodiment.

As used herein, the terminology "computer" or "computing device" includes any unit, or combination of units, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like.

The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Generally, methods, apparatus, and systems for managing and monitoring a network are disclosed. In one example embodiment, a customer premise equipment device may scan available networks including CBRS Devices (CBSD) and base stations, connect to a network based on a set of parameters, provide network services for voice and data applications of various devices, manage paging and network messages, and the like. In one example embodiment, the set of parameters may include signal strength of the network, available capacity of the network, number of users in the network, and required QoS for data, voice, and other applications. In one example embodiment, the customer premise equipment device performs measurements on the CBRS Devices (CBSD) and base stations.

FIG. 1 is a diagram of an example citizens broadband radio service network 1100 and a customer premise equipment device 1400 with multiple subscriber identification module devices, in accordance with an example embodiment. In one example embodiment, an architecture 1000 includes a CBRS network 1100 which provides wireless coverage. The CBRS network 1100 includes CBSDs 1110, 1120, and 1130. In one example embodiment, the CBSDs 1110, 1120, and 1130 form a cluster that is controlled by a controller 1105. The number of clusters and the number of CBSDs is illustrative and the architecture 1000 may include more or fewer clusters and each cluster may include more or fewer CBSDs. The architecture 1000 includes an SAS 1200 which is connected to or in communication (collectively "in communication with") with each of the CPE 1400, CBSDs 1110, 1120, and 1130, and/or the controller 1105 when appropriate.

In one example embodiment, the architecture 1000 includes a licensed spectrum network 1300 which provides wireless coverage. The licensed spectrum network 1300 includes base stations 1310 and 1320. The number of base stations is illustrative and the architecture 1000 may include more or fewer base stations. The base stations 1310 and 1320 are in communication with a core network 1330, which includes a mobility management entity (MME) 1332, a serving gateway 1334, and a packet data network (PDN) gateway 1336. The core network 1330 is in communication with a network 1340, which includes, for example, the Internet, and which is in communication with a memory/storage 1350.

The CPE device 1400 is in communication with at least one of the CBSDs 1110, 1120, and 1130, and/or at least one of the base stations 1310 and 1320. The communications between the CPE device 1400, particular CBSDs 1110, 1120, and 1130, the SAS 1200, the controller 1105 when applicable, particular base stations 1310 and 1320 (using, for example, wireless cellular signals), the core network 1330, the network 1340, and the memory/storage 1350, as appropriate and applicable, include, for example, wired communications, wireless communications, or a combination thereof. In one example embodiment, the CPE device 1400 is roof-mounted on a house or other residence. In one example embodiment, the CPE device 1400 is a base station-type device having two subscriber identification module (SIM) cards and can connect to any other base station 1310, 1320 in the network 1100 to receive data and voice services with or without pre-defined quality of service levels. In one example embodiment, the architecture 1000 executes the techniques described in FIG. 7. The architecture 1000 is illustrative and may include additional, fewer or different devices, entities and the like which may be similarly or differently architected without departing from the scope of the specification and claims herein. Moreover, the illustrated devices may perform other functions without departing from the scope of the specification and claims herein. Furthermore, though reference is made to "dual" SIM, more than two SIM cards could be used if desired.

The CBSDs 1110, 1120, and 1130 can include a base station, an access point, an access node or like device which enables radio communications access between, for example, the CPE device 1400 and other devices. Each CBSD 1110, 1120, and 1130 can, for example, be authorized and granted spectrum allocation by the SAS 1200 (which can be communicated via the controller 1105, for example). Each CBSD 1110, 1120, and 1130 can, for example, have sectors which provide wireless communications coverage.

The base stations 1310 and 1320 can include, for example, a node-B, an evolved node-B, an access point, an access node or like device which enables radio communications access between, for example, the CPE device 1400 and other devices. Each base station 1310 and 1320 can, for example, have sectors which provide wireless communications coverage.

In one example embodiment, the CBRS network 1100 and the CBSDs 1110, 1120, and 1130 are owned and operated by the service provider (such as an MSO), and the base stations 1310 and 1320 are owned and operated by a mobile network operator (MNO). Other mobile network operators may own and operate other licensed spectrum networks 1300 within range of the service provider. In a non-limiting example, a CBRS network 1100 is operated by a service provider, such as Charter Communications, and the service provider collaborates with one or more mobile network operators on the operation of the licensed spectrum networks 1300. Other embodiments can have different ownership and/or operating arrangements. Aspects of the invention include an MSO obtaining the CPE device 1400 from a vendor and configuring the CPE device 1400 and/or changing software on the CPE device 1400.

The SAS 1200 enables access to the CBRS spectrum and dynamically manages the spectrum for optimal use, efficiency, and compliance with CBRS rules. The SAS 1200 communicates with each CBSD for registration, grant allocation/deallocation and interference management. In some instances, the SAS 1200 performs interference analysis based on power measurements.

Operationally, and as described in detail hereinbelow, the SAS 1200 grants spectrum to each activated CBSD, such as the CBSDs 1110, 1120, and 1130 and establishes a wireless coverage of CBRS network 1100. In one example embodiment, the communication is via the controller 1105. Base stations 1310 and 1320 establish a wireless coverage of licensed spectrum network 1300. In one example embodiment, the CPE device 1400 connects to a base station 1310 (using wireless cellular signals), a CBSD 1110, and to a Wi-Fi router 1410 for communicating with, for example, Internet of Things (IoT) devices in a residence. The CPE device 1400 is essentially treated as a cellular phone by the base station 1310, is treated as an xDSL cable by the Wi-Fi router, and is treated as a user terminal by the CBSD 1110.

The CPE device 1400 can be connected to a CBSD, such as CBSDs 1110, 1120, and 1130, using, for example, a first radio. The SIM radio controller (see discussion of FIGS. 4-6 below) initiates scanning of other CBSDs 1110, 1120, and 1130 and base stations 1310 and 1320 to determine signal strengths. In one example embodiment, the signal strength measurements are performed by the SIM that is not being used. The signal strengths can, for example, be Reference Signal Received Power (RSRP), Reference Signal Received Quality (RSRQ), or other power measurement metrics. The SIM radio controller saves network connection measurements that are stronger than a current network connection plus a defined delta or offset. This can, for example, be saved by the SIM radio controller in the CPE device 1400.

The CPE device 1400 can, at the behest of the SIM radio controller, measure real-time QoS being experienced by the CPE device 1400. In one example embodiment, the measurements are done using the connected SIM and radio. The SIM radio controller then compares the measured QoS against a required QoS.

Figure 2:
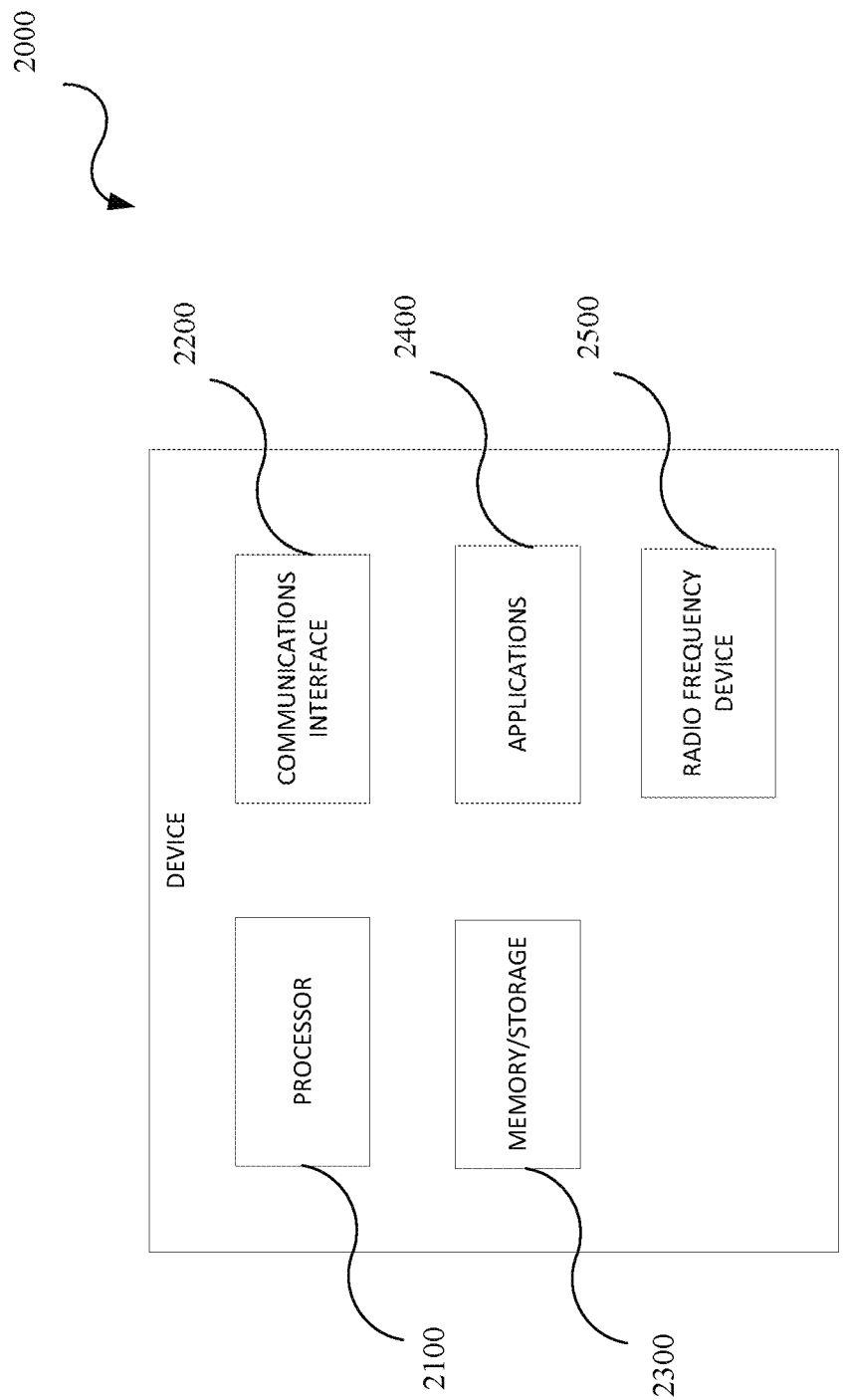
FIG. 2 is a block diagram of an example device, in accordance with an example embodiment.

FIG. 2 is a block diagram of an example device 2000, in accordance with an example embodiment. The device 2000 includes, but is not limited to, a processor 2100, a memory/storage 2300, a communication interface 2200, applications 2400, and a radio frequency device 2500. The device 2000 can include or implement, for example, any of the CBSDs 1110, 1120, and 1130, and the base stations 1310 and 1320. In one example embodiment, the memory/storage 2300 caches the data prior to sending to a new network connection. The applicable or appropriate SIM radio controller techniques or methods using multiple SIM devices as described herein are stored in the memory/storage 2300 and executed by the processor 2100 in cooperation with the memory/storage 2300, the communications interface 2200, the applications 2400, and the radio frequency device 2500 as appropriate. The device 2000 may include other elements which may be desirable or necessary to implement the devices, systems, compositions and methods described herein (e.g. bus or other coupling) but the same will be apparent to the skilled artisan, given the teachings herein, and are omitted to avoid clutter.

Figure 3:
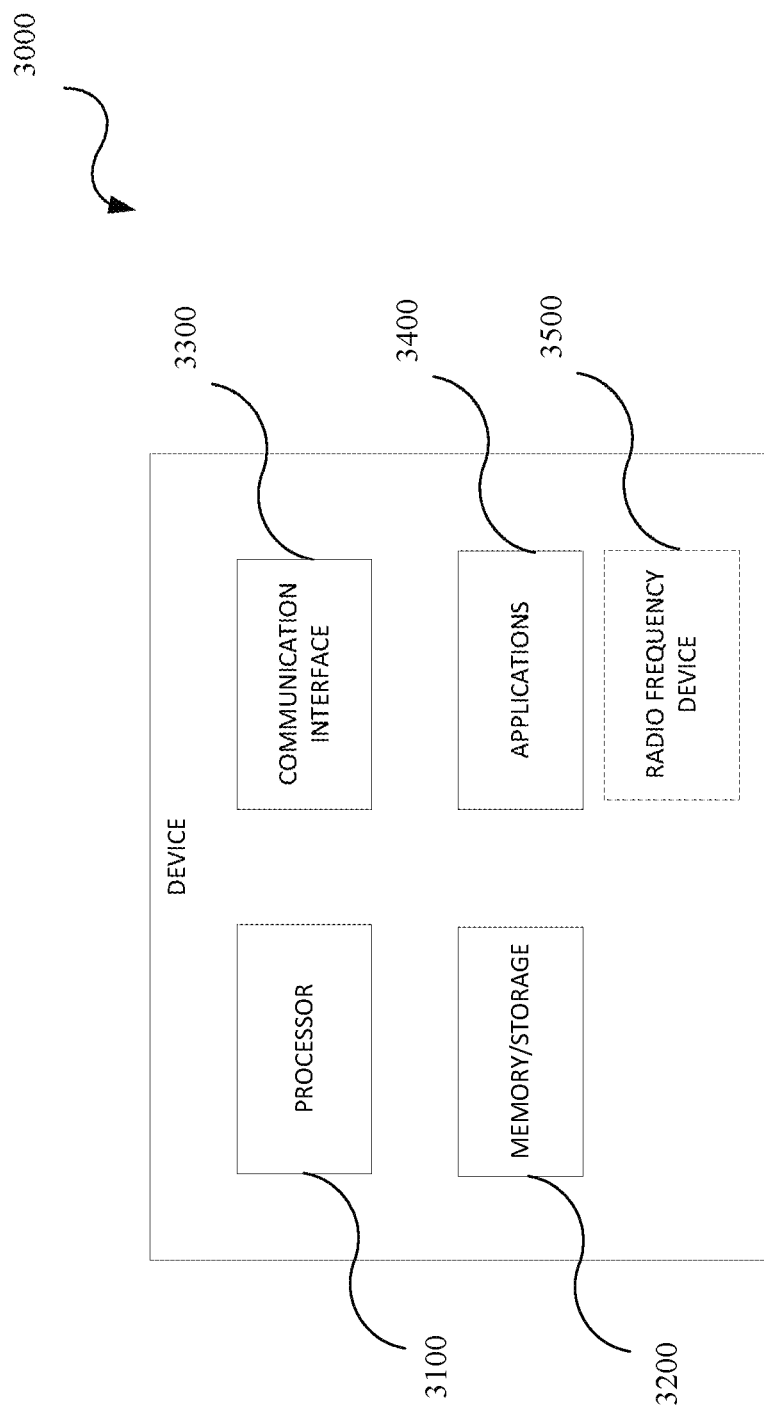
FIG. 3 is a block diagram of an example device, in accordance with an example embodiment.

FIG. 3 is a block diagram of an example device 3000, in accordance with an example embodiment. The device 3000 includes, but is not limited to, a processor 3100, a memory/storage 3200, a communication interface 3300, and applications 3400. In an exemplary implementation, the device 3000 includes a radio frequency device 3500. The device 3000 can include or implement, for example, the controller 1105 and the SAS 1200. In an implementation, the memory/storage 3200 stores the interference map, spectrum allocations, and other information. The applicable or appropriate SIM radio controller techniques or methods using multiple SIM devices as described herein are stored in the memory/storage 3200 and executed by the processor 3100 in cooperation with the memory/storage 3200, the communications interface 3300, the applications 3400, and the radio frequency device 3500 (when applicable) as appropriate. The device 3000 may include other elements which may be desirable or necessary to implement the devices, systems, compositions and methods described herein (e.g. bus or other coupling) but the same will be apparent to the skilled artisan, given the teachings herein, and are omitted to avoid clutter.

Figure 4:
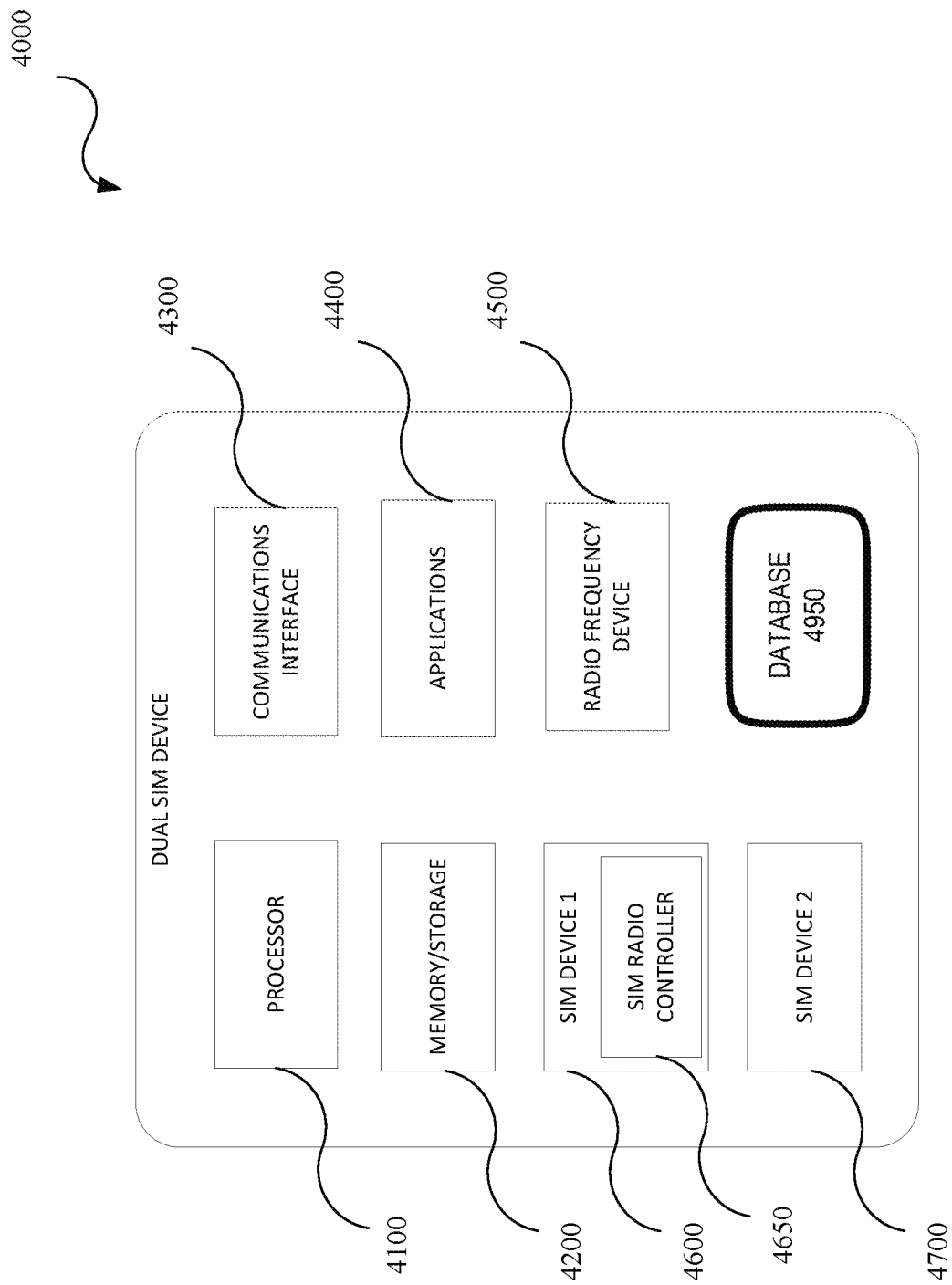
FIG. 4 is a block diagram of a first example of a multiple SIM device, in accordance with an example embodiment.

FIG. 4 is a block diagram of a first example of a multiple SIM device 4000, in accordance with an example embodiment. The device 4000 includes, but is not limited to, a processor 4100, a memory/storage 4200, a communication interface 4300, applications 4400, a radio frequency device 4500, a first SIM 4600, a SIM radio controller 4650, and a second SIM 4700. The device 4000 can include or implement, for example, the CPE device 1400. In one example embodiment, the memory/storage 4200 stores the required QoS, measured QoS, power measurements, user settings and the like. The applicable or appropriate SIM radio controller techniques or methods using multiple SIM devices as described herein are stored in the memory/storage 4200 and executed by the SIM radio controller 4650 and the processor 4100 in cooperation with the memory/storage 4200, the communications interface 4300, the applications 4400, the radio frequency device 4500, the first SIM 4600, and the second SIM 4700 as appropriate. In one example embodiment, the first SIM 4600 and the second SIM 4700 are provisioned for operation with unlicensed spectrum, CBRS spectrum or the like as operated by a service provider, or with another MSO. In one example embodiment, the first SIM 4600 and the second SIM 4700 operate on a time slotted basis with the radio frequency device 4500. In one example embodiment, the SIM radio controller 4650 is implemented as a combination of software and firmware as part of the first SIM 4600. In one example embodiment, the SIM radio controller 4650 is implemented as a combination of software and firmware as part of the second SIM 4700 (omitted from figure to avoid clutter). In one example embodiment, SIM radio controller 4650 is implemented as a combination of software and firmware as part of the SIM provisioned for operation with the unlicensed spectrum. In one example embodiment, the SIM radio controller 4650 is implemented as a combination of software and firmware as part of the SIM provisioned for operation with the CBRS spectrum. The SIM radio controller 4650 implements the methods and techniques described herein, such as for example, with respect to FIG. 7. In addition, in one example embodiment, a database 4950, 5950, 6950 includes a look-up table (not shown) that maintains, for example, the physical cell identifier (PCI) of base stations 1310 and 1320. (In one example embodiment, the base stations 1310 and 1320 are operated by service providers that provide, for example, data and voice services.) The device 4000 can include other elements which may be desirable or necessary to implement the devices, systems, compositions and methods described herein (e.g. bus or other coupling) but the same will be apparent to the skilled artisan, given the teachings herein, and are omitted to avoid clutter.

Figure 5:
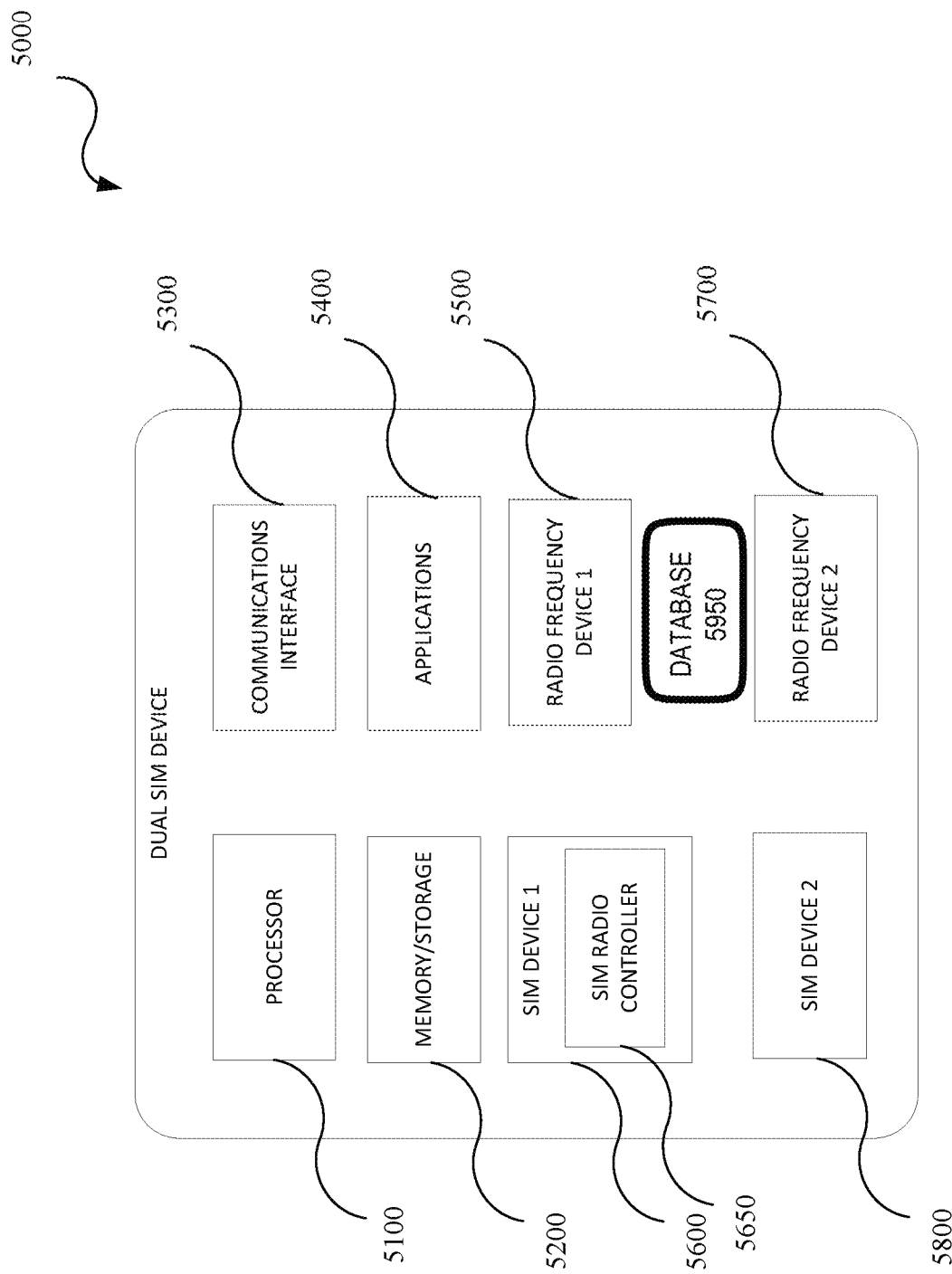
FIG. 5 is a block diagram of a second example of a multiple SIM device, in accordance with an example embodiment.

FIG. 5 is a block diagram of a second example of a multiple SIM device 5000, in accordance with an example embodiment. The device 5000 includes, but is not limited to, a processor 5100, a memory/storage 5200, a communication interface 5300, applications 5400, a first radio frequency device 5500, a first SIM 5600, a SIM radio controller 5650, a second radio frequency device 5700, and a second SIM 5800. The device 5000 can include or implement, for example, the CPE device 1400. In one example embodiment, the memory/storage 5200 stores the required QoS, measured QoS, power measurements, user settings and the like. The applicable or appropriate SIM radio controller techniques or methods using multiple SIM devices as described herein are stored in the memory/storage 5200 and executed by the SIM radio controller 5650 and the processor 5100 in cooperation with the memory/storage 5200, the communications interface 5300, the applications 5400, the first radio frequency device 5500, the first SIM 5600, the second radio frequency device 5700, and the second SIM 5800 as appropriate. In one example embodiment, the first SIM 5600 is provisioned for operation with unlicensed spectrum, CBRS spectrum or the like as operated by a service provider, and the second SIM 5800 is provisioned with another MSO or the like but operated by the service provider. In one example embodiment, the first SIM 5600 operates with the first radio frequency device 5500 and the second SIM 5800 operates with the second radio frequency device 5700. In one example embodiment, the SIM radio controller 5650 is implemented as a combination of software and firmware as part of the first SIM 5600; alternatively, the SIM radio controller 5650 is implemented as a combination of software and firmware as part of the SIM provisioned for operation with the unlicensed spectrum, or the SIM radio controller 5650 is implemented as a combination of software and firmware as part of the SIM provisioned for operation with the CBRS spectrum. The SIM radio controller 5650 may implement the methods and techniques described herein, such as for example, with respect to FIG. 7. The device 5000 can include other elements which may be desirable or necessary to implement the devices, systems, compositions and methods described herein (e.g. bus or other coupling) but the same will be apparent to the skilled artisan, given the teachings herein, and are omitted to avoid clutter. In addition, as noted, in one example embodiment, a database 5950 includes a look-up table (not shown).

Figure 6:
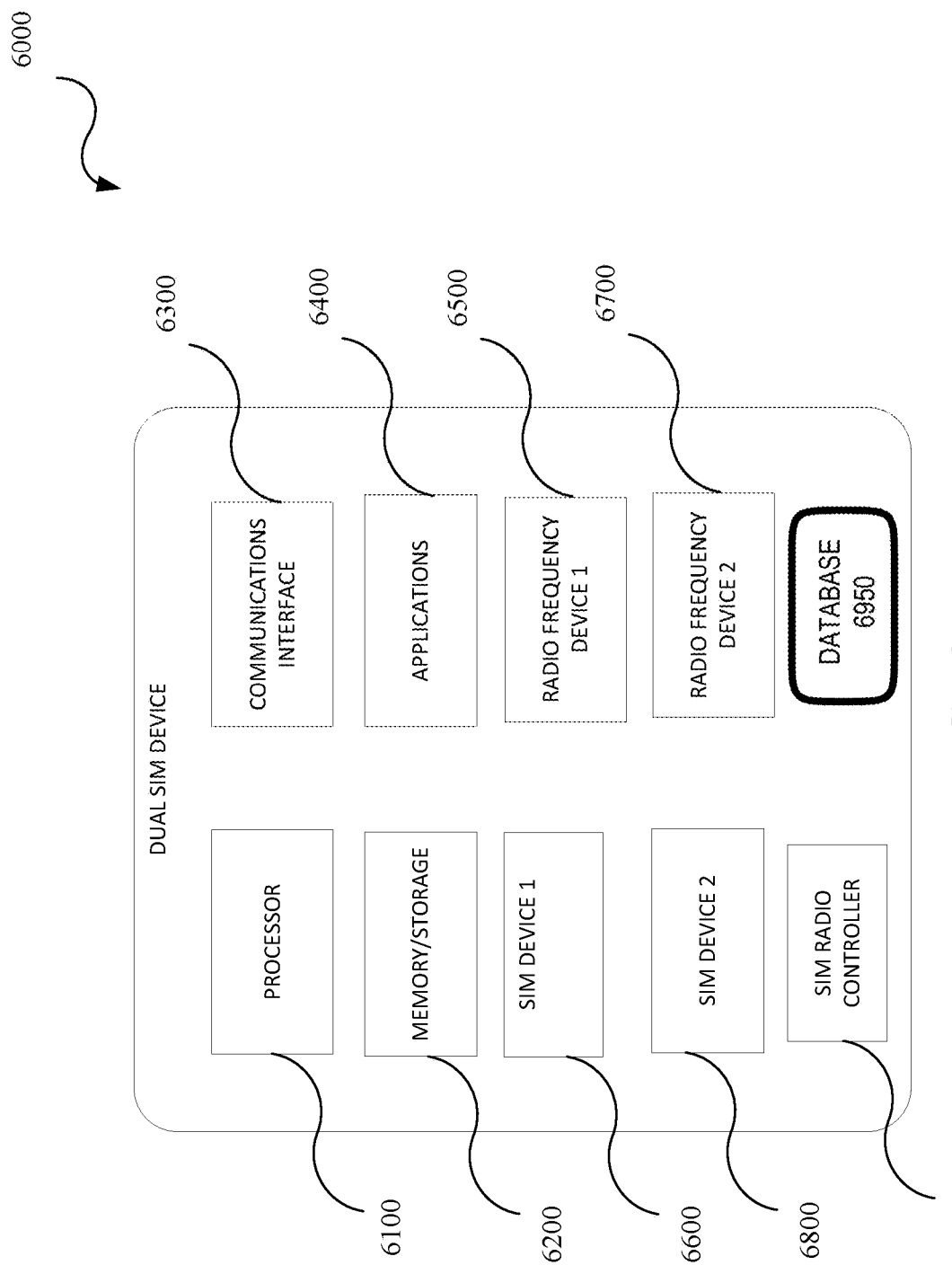
FIG. 6 is a block diagram of a third example of a multiple SIM device, in accordance with an example embodiment.

FIG. 6 is a block diagram of a third example of a multiple SIM device 6000, in accordance with an example embodiment. The device 6000 includes, but is not limited to, a processor 6100, a memory/storage 6200, a communication interface 6300, applications 6400, a first radio frequency device 6500, a first SIM 6600, a second radio frequency device 6700, a second SIM 6800, and a SIM radio controller 6900. The device 6000 can include or implement, for example, the CPE device 1400. In one example embodiment, the memory/storage 6200 stores the required QoS, measured QoS, power measurements, user settings and the like. The applicable or appropriate SIM radio controller techniques or methods using multiple SIM devices as described herein are stored in the memory/storage 6200 and executed by the SIM radio controller 6900 and the processor 6100 in cooperation with the memory/storage 6200, the communications interface 6300, the applications 6400, the first radio frequency device 6500, the first SIM 6600, the second radio frequency device 6700, and the second SIM 6800 as appropriate. In one example embodiment, the first SIM 6600 is provisioned for operation with unlicensed spectrum, CBRS spectrum or the like as operated by a service provider, and the second SIM 6700 is provisioned with another MSO or the like but operated by the service provider. In one example embodiment, the first SIM 6600 operates with the first radio frequency device 6500 and the second SIM 6800 operates with the second radio frequency device 6700. In one example embodiment, the SIM radio controller 6900 is implemented as a combination of software and firmware as part of the multiple SIM device. The SIM radio controller 6900 implements the methods and techniques described herein, such as for example, with respect to FIG. 7. The device 6000 can include other elements which may be desirable or necessary to implement the devices, systems, compositions and methods described herein (e.g. bus or other coupling) but the same will be apparent to the skilled artisan, given the teachings herein, and are omitted to avoid clutter. In addition, as noted, in one example embodiment, a database 6950 includes a look-up table (not shown).

Figure 7:
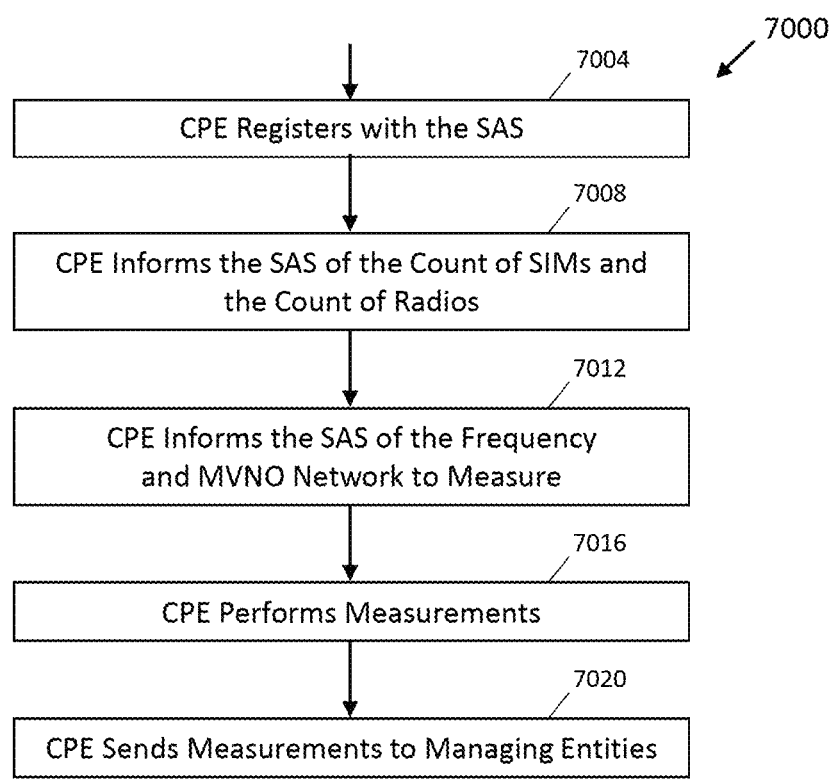
FIG. 7 is a flowchart of an example workflow for techniques or methods for monitoring and managing a network, in accordance with an example embodiment.

FIG. 7 is a flowchart of an example workflow 7000 for techniques or methods for monitoring and managing a network, in accordance with an example embodiment. In one example embodiment, the CPE device 1400 registers with the SAS 1200 (operation 7004) and informs the SAS 1200 of its count of SIM cards and its count of radios (operation 7008) (this operation can, for example, be carried out for every CPE). The CPE device 1400 informs the SAS 1200 of the frequency and the mobile virtual network operator (MVNO) network 1000 to measure (operation 7012). Each CPE device 1400 performs one or more measurements based on, for example, the frequency and operator the MVNO network 1000 (operation 7016). In one example embodiment, each CPE device 1400 will use a set or all of its antennas to make measurements, such as a reference signal received power (RSRP), a received signal strength indicator (RSSI), and a reference signal received quality (RSRQ) values together with sector and base station IDs from a wireless operator. The measurements are performed at different times. Since each CPE device 1400 should complete its own tasks first, measurements are only performed if the corresponding CPE device 1400 has available resources for performing measurements, or when resource usage of the CPE device 1400 is under a certain load threshold. Each CPE device 1400 sends the measurement results to the managing entity (operation 7020). For example, the results may be sent to a data server in the CBRS network 1100. In one example embodiment, each measurement is marked with the location of the measuring CPE device 1400, such as defined by the latitude and the longitude of the location. Reference is made to the table below, where the PCI is the physical cell identifier of the corresponding base station 1310, 1320 and the Xs represent the corresponding power measurements:

| CPE Location | PCI | RSRP | RSSI | RSRQ |
|---|---|---|---|---|
| Lat, Long | 100 | X1-1 | X1-2 | X1-3 |
| Lat, Long | 200 | X2-1 | X2-2 | X2-3 |

Following the performance of workflow 700, the aggregated measurements are utilized, for example, to select between different networks of base stations 1310 and 1320 where each network may be operated by a different mobile network operator. The network may be selected on a per CPE device 1400 basis where the network having the base station 1310, 1320 with the strongest signal measurements is selected. Thus, advantageously, one or more embodiments address a scenario wherein an MSO desires to launch a Dual SIM Device CBRS Network but does not have enough data regarding the wireless operator(s) with which it will enter into an MVNO agreement. That is, at network locations where the MSO will launch a 3.5 GHz CBRS network, the MSO does not have MVNO network performance data so that it can configure dual SIM terminals to hand over to the MVNO network or vice versa. One or more embodiments provide techniques to determine signal strength/characteristics, and configure network components such as the CPE device 1400 in response. For example, measurements in the above table can be used to tweak certain measurements on the UE side so that UE can switch off to an MVNO network at locations where UE can receive a good service.

Given the discussion thus far, it will be appreciated that, an exemplary method comprises operations of registering a customer premise equipment device 1400 with a spectrum access system 1200 (operation 7004); informing the spectrum access system 1200 of a count of subscriber identification module (SIM) cards and a count of radios in the customer premise equipment device 1400 (operation 7008); informing the spectrum access system 1200 of a frequency and an identity of the network 1100 to monitor (operation 7012); performing, by the customer premise equipment device 1400, one or more measurements based on the frequency and the identity of the network 1100 (operation 7016); and sending the one or more measurements to a managing server (operation 7020).

In one aspect, a customer premise equipment device 1400 comprises a first subscriber identification module (SIM) and a second subscriber identification module (SIM); a memory; and at least one processor coupled to said memory and in data communication with said first subscriber identification module (SIM), and said second subscriber identification module (SIM); wherein said at least one processor coupled to said memory, said first subscriber identification module (SIM), and said second subscriber identification module (SIM) are cooperatively configured to perform operations comprising registering the customer premise equipment device 1400 with a spectrum access system 1200 (operation 7004); informing the spectrum access system 1200 of a count of subscriber identification module (SIM) cards and a count of radios in the customer premise equipment device 1400 (operation 7008); informing the spectrum access system 1200 of a frequency and an identity of the network 1100 to monitor (operation 7012); performing, by the customer premise equipment device 1400, one or more measurements based on the frequency and the identity of the network 1100 (operation 7016); and sending the one or more measurements to a managing server (operation 7020).

In one aspect, a system comprises a licensed spectrum network 1300 configured to provide wireless coverage; one or more base stations 1310, 1320 configured to wirelessly communicate with the licensed spectrum network 1300; a network 1100; a spectrum access system 1200; a customer premise equipment device 1400 configured to wirelessly communicate with the licensed spectrum network 1300 and configured to communicate with the network 1100, the customer premise equipment device 1400 comprising a first subscriber identification module (SIM) and a second subscriber identification module (SIM); a memory; and at least one processor coupled to the memory and in data communication with the first subscriber identification module (SIM), and the second subscriber identification module (SIM); wherein the at least one processor coupled to the memory, the first subscriber identification module (SIM), and the second subscriber identification module (SIM) are cooperatively configured to perform operations comprising registering the customer premise equipment device 1400 with the spectrum access system 1200; informing the spectrum access system 1200 of a count of subscriber identification module (SIM) cards and a count of radios in the customer premise equipment device 1400; informing the spectrum access system 1200 of a frequency and an identity of the licensed spectrum network 1300 to monitor; performing one or more measurements based on the frequency and the identity of the licensed spectrum network 1300; and sending the one or more measurements to a managing server.

In one aspect, a non-transitory computer readable medium comprises computer executable instructions which when executed by a computer cause the computer to perform operations comprising registering the customer premise equipment device 1400 with a spectrum access system 1200 (operation 7004); informing the spectrum access system 1200 of a count of subscriber identification module (SIM) cards and a count of radios in the customer premise equipment device 1400 (operation 7008); informing the spectrum access system 1200 of a frequency and an identity of the network 1100 to monitor (operation 7012); performing, by the customer premise equipment device 1400, one or more measurements based on the frequency and the identity of the network 1100 (operation 7016); and sending the one or more measurements to a managing server (operation 7020).

In one example embodiment, the measurements comprise one or more of a reference signal received power (RSRP) value, a received signal strength indicator (RSSI) value, and a reference signal received quality (RSRQ) value. In one example embodiment, the measurements are performed at during a configuration of the network 1100, at a prescheduled time, when the customer premise equipment device 1400 has available resources, or when a resource usage of the customer premise equipment device 1400 is under a specified load threshold. In one example embodiment, the measurements are performed when resource usage of the customer premise equipment device 1400 is under a specified load threshold. In one example embodiment, each measurement is marked with a location of the customer premise equipment device 1400. In one example embodiment, the customer premise equipment device 1400 is a base station-type device comprising at least one subscriber identification module (SIM) card and that can connect to any other base station 1310, 1320 in the network 1100 to receive data and voice services.

In one example embodiment, the operations further comprise comparing one or more measurements for each of a plurality of base stations 1310, 1320 of a plurality of networks 1100; selecting the network 1100 having the base station 1310, 1320 with the greatest signal strength; and transferring information from the customer premise equipment device 1400 via the selected network 1100. In one example embodiment, the customer premise equipment device 1400 performs the one or more measurements via a first subscriber identification module (SIM) card and the customer premise equipment device 1400 transfers information via a second subscriber identification module (SIM) card. In one example embodiment, one or more dynamic software components of the customer premise equipment device 1400 are changed based on at least one of a mobile network operator (MNO), a multiple systems operator (MSO), a user terminal, quality of service delivered, a wireless channel condition, a location of the customer premise equipment device 1400, a hardware version of the customer premise equipment device 1400, a software version of the customer premise equipment device 1400, a location of a Citizens Broadband Radio Service device 1110, 1120, and 1130, a hardware version of a Citizens Broadband Radio Service device 1110, 1120, and 1130, a software version of a Citizens Broadband Radio Service device 1110, 1120, and 1130, and a load of the customer premise equipment device 1400. In one example embodiment, the customer premise equipment device 1400 performs the comparison and selecting operations. In one example embodiment, at least one of the base stations 1310, 1320 performs the comparison and selecting operations.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). The means do not include transmission media per se or disembodied signals per se. Appropriate interconnections via bus, network, and the like can also be included.

As shown in FIG. 4, memory/storage 4200 configures the processor 4100 to implement one or more methods, steps, and functions. The memory/storage 4200 could be distributed or local and the processor 4100 could be distributed or singular. Different steps could be carried out by different processors.

The memory/storage 4200 could be implemented as an electrical, magnetic or optical memory, or any combination of these or other types of storage devices. It should be noted that if distributed processors are employed, each distributed processor that makes up processor 4100 generally contains its own addressable memory space. It should also be noted that some or all of multiple SIM device 4000 can be incorporated into an application-specific or general-use integrated circuit. For example, one or more method steps could be implemented in hardware in an ASIC or via a field-programmable gate array (FPGA) rather than using firmware. A variety of possible input/output devices (e.g., keyboards, mice, and the like) may be incorporated into the multiple SIM device 4000. Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 700 or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program product comprising computer program code means adapted to perform one or all of the steps of any methods or claims set forth herein when such program is run, for example, on a CPE device 1400; a virtualized or non-virtualized hardware server implementing, or the like, and that such program may be embodied on a tangible computer readable recordable storage medium. As used herein, including the claims, unless it is unambiguously apparent from the context that only server software is being referred to, a "server" includes a physical data processing system running one or more server programs. It will be understood that such a physical server may or may not include a display, keyboard, or other input/output components. Furthermore, as used herein, including the claims, a "router" includes a networking device with both software and hardware tailored to the tasks of routing and forwarding information.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g. modules/sub-modules to implement the components in, for example, the CPE device 1400). The method steps can then be carried out using the distinct software modules of the system, as described above, executing on one or more hardware processors (e.g., one or more hardware processors of CPE device 1400 and/or other depicted components). Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, the method comprising the operations of:
   registering a customer premise equipment device with a spectrum access system;
   informing the spectrum access system of a first data value and a second data value, the first data value specifying a count of subscriber identification module (SIM) cards and the second data value specifying a count of radios in the customer premise equipment device;
   informing the spectrum access system of a frequency and an identity of a network to monitor;
   performing, by the customer premise equipment device, one or more measurements based on the count of subscriber identification module (SIM) cards, the count of radios, the frequency and the identity of the network; and
   sending the one or more measurements to a managing server.

2. The method of claim 1, wherein the measurements comprise one or more of a reference signal received power (RSRP) value, a received signal strength indicator (RSSI) value, and a reference signal received quality (RSRQ) value.

3. The method of claim 1, wherein the measurements are performed during a configuration of the network, at a prescheduled time, when the customer premise equipment device has available resources, or when resource usage of the customer premise equipment device is under a specified load threshold.

4. The method of claim 1, wherein each measurement is marked with a location of the customer premise equipment device.

5. The method of claim 1, wherein, in the registering step, the customer premise equipment device comprises a base station-type device that comprises at least one of said subscriber identification module (SIM) cards and that is configured to connect to any other base station in the network to receive data and voice services.

6. The method of claim 1, further comprising:
   comparing one or more measurements for each of a plurality of base stations of a plurality of networks;
   selecting the network having the base station with the greatest signal strength; and
   transferring information from the customer premise equipment device via the selected network.

7. The method of claim 1, further comprising changing one or more dynamic software components of the customer premise equipment device based on at least one of a mobile network operator (MNO), a multiple systems operator (MSO), a user terminal, quality of service delivered, a wireless channel condition, a location of the customer premise equipment device, a hardware version of the customer premise equipment device, a software version of the customer premise equipment device, a location of a Citizens Broadband Radio Service device, a hardware version of a Citizens Broadband Radio Service device, a software version of a Citizens Broadband Radio Service device, and a load of the customer premise equipment device.

8. A method, the method comprising the operations of:
   registering a customer premise equipment device with a spectrum access system;
   informing the spectrum access system of a count of subscriber identification module (SIM) cards and a count of radios in the customer premise equipment device;
   informing the spectrum access system of a frequency and an identity of a network to monitor;
   performing, by the customer premise equipment device, one or more measurements based on the count of subscriber identification module (SIM) cards, the count of radios, the frequency and the identity of the network;
   sending the one or more measurements to a managing server;
   comparing one or more measurements for each of a plurality of base stations of a plurality of networks;
   selecting the network having the base station with the greatest signal strength; and
   transferring information from the customer premise equipment device via the selected network, wherein the customer premise equipment device performs the one or more measurements via a first subscriber identification module (SIM) card and the customer premise equipment device transfers information via a second subscriber identification module (SIM) card.

9. A customer premise equipment device comprising:
a first subscriber identification module (SIM) and a second subscriber identification module (SIM);
a memory; and
at least one processor coupled to said memory and in data communication with said first subscriber identification module (SIM), and said second subscriber identification module (SIM);
wherein said at least one processor coupled to said memory, said first subscriber identification module (SIM), and said second subscriber identification module (SIM) are cooperatively configured to perform operations comprising:
  registering the customer premise equipment device with a spectrum access system;
  informing the spectrum access system of a first data value and a second data value, the first data value specifying a count of subscriber identification module (SIM) cards and the second data value specifying a count of radios in the customer premise device;
  informing the spectrum access system of a frequency and an identity of a network to monitor;
  performing, by the customer premise equipment device, one or more measurements based on the count of subscriber identification module (SIM) cards, the count of radios, the frequency and the identity of the network; and
  sending the one or more measurements to a managing server.

10. The customer premise equipment device of claim 9, wherein the measurements comprise one or more of a reference signal received power (RSRP) value, a received signal strength indicator (RSSI) value, and a reference signal received quality (RSRQ) value.

11. The customer premise equipment device of claim 9, wherein said at least one processor coupled to said memory, said first subscriber identification module (SIM), and said second subscriber identification module (SIM) are further cooperatively configured to perform the measurements during a configuration of the network, at a prescheduled time, when the customer premise equipment device has available resources, or when a resource usage of the customer premise equipment device is under a specified load threshold.

12. The customer premise equipment device of claim 9, wherein each measurement is marked with a location of the customer premise equipment device.

13. The customer premise equipment device of claim 9, wherein the customer premise equipment device comprises a base station-type device and wherein the customer premise equipment device is configured to connect to any other base station in the network to receive data and voice services.

14. The customer premise equipment device of claim 9, wherein said at least one processor coupled to said memory, said first subscriber identification module (SIM), and said second subscriber identification module (SIM) are further cooperatively configured to:
  compare one or more measurements for each of a plurality of base stations of a plurality of networks;
  select the network having the base station with the greatest signal strength; and
  transfer information from the customer premise equipment device via the selected network.

15. The customer premise equipment device of claim 9, the operations further comprising changing one or more dynamic software components of the customer premise equipment device based on at least one of a mobile network operator (MNO), a multiple systems operator (MSO), a user terminal, quality of service delivered, a wireless channel condition, a location of the customer premise equipment device, a hardware version of the customer premise equipment device, a software version of the customer premise equipment device, a location of a Citizens Broadband Radio Service device, a hardware version of a Citizens Broadband Radio Service device, a software version of a Citizens Broadband Radio Service device, and a load of the customer premise equipment device.

16. A customer premise equipment device comprising:
a first subscriber identification module (SIM) and a second subscriber identification module (SIM);
a memory; and
at least one processor coupled to said memory and in data communication with said first subscriber identification module (SIM), and said second subscriber identification module (SIM);
wherein said at least one processor coupled to said memory, said first subscriber identification module (SIM), and said second subscriber identification module (SIM) are cooperatively configured to perform operations comprising:
  registering the customer premise equipment device with a spectrum access system;
  informing the spectrum access system of a count of subscriber identification module (SIM) cards and a count of radios in the customer premise device;
  informing the spectrum access system of a frequency and an identity of a network to monitor;
  performing, by the customer premise equipment device, one or more measurements based on the count of subscriber identification module (SIM) cards, the count of radios, the frequency and the identity of the network; and
  sending the one or more measurements to a managing server, wherein the customer premise equipment device performs the one or more measurements via the first subscriber identification module (SIM) card and the customer premise equipment device transfers information via the second subscriber identification module (SIM) card.

17. A system comprising:
a licensed spectrum network configured to provide wireless coverage;
one or more base stations configured to wirelessly communicate with the licensed spectrum network;
a citizens broadband radio service network;
a spectrum access system;
a customer premise equipment device configured to wirelessly communicate with the licensed spectrum network and configured to communicate with the citizens broadband radio service network, the customer premise equipment device comprising:
  a first subscriber identification module (SIM) and a second subscriber identification module (SIM);
  a memory; and
  at least one processor coupled to the memory and in data communication with the first subscriber identification module (SIM), and the second subscriber identification module (SIM);
  wherein the at least one processor coupled to the memory, the first subscriber identification module (SIM), and the second subscriber identification module (SIM) are cooperatively configured to perform operations comprising:
registering the customer premise equipment device with the spectrum access system;
informing the spectrum access system of a first data value and a second data value, the first data value specifying a count of subscriber identification module (SIM) cards and the second data value specifying a count of radios in the customer premise equipment device;
informing the spectrum access system of a frequency and an identity of the licensed spectrum network to monitor;
performing one or more measurements based on the count of subscriber identification module (SIM) cards, the count of radios, the frequency and the identity of the licensed spectrum network; and
sending the one or more measurements to a managing server.

18. The system of claim 17, wherein the measurements comprise one or more of a reference signal received power (RSRP) value, a received signal strength indicator (RSSI) value, and a reference signal received quality (RSRQ) value.

19. The system of claim 17, wherein the measurements are performed during a configuration of the citizens broadband radio service network, at a prescheduled time, when the customer premise equipment device has available resources, or when resource usage of the customer premise equipment device is under a specified load threshold.

20. The system of claim 17, wherein each measurement is marked with a location of the customer premise equipment device.

21. The system of claim 17, wherein, in the registering step, the customer premise equipment device comprises a base station-type device that comprises at least one of said subscriber identification module (SIM) cards and that is configured to connect to any other base station in the licensed spectrum network to receive data and voice services.

22. The system of claim 17, further comprising:
comparing one or more measurements for each of a plurality of base stations of a plurality of licensed spectrum networks;
selecting the licensed spectrum network having the base station with the greatest signal strength; and
transferring information from the customer premise equipment device via the selected licensed spectrum network.

23. The system of claim 22, wherein the customer premise equipment device performs the comparison and selecting operations.

24. The system of claim 22, wherein at least one of the base stations performs the comparison and selecting operations.

25. A system comprising:
a licensed spectrum network configured to provide wireless coverage;
one or more base stations configured to wirelessly communicate with the licensed spectrum network;
a citizens broadband radio service network;
a spectrum access system;
a customer premise equipment device configured to wirelessly communicate with the licensed spectrum network and configured to communicate with the citizens broadband radio service network, the customer premise equipment device comprising:
a first subscriber identification module (SIM) and a second subscriber identification module (SIM);
a memory; and
at least one processor coupled to the memory and in data communication with the first subscriber identification module (SIM), and the second subscriber identification module (SIM);
wherein the at least one processor coupled to the memory, the first subscriber identification module (SIM), and the second subscriber identification module (SIM) are cooperatively configured to perform operations comprising:
registering the customer premise equipment device with the spectrum access system;
informing the spectrum access system of a count of subscriber identification module (SIM) cards and a count of radios in the customer premise equipment device;
informing the spectrum access system of a frequency and an identity of the licensed spectrum network to monitor;
performing one or more measurements based on the count of subscriber identification module (SIM) cards, the count of radios, the frequency and the identity of the licensed spectrum network;
sending the one or more measurements to a managing server;
comparing one or more measurements for each of a plurality of base stations of a plurality of licensed spectrum networks;
selecting the licensed spectrum network having the base station with the greatest signal strength; and
transferring information from the customer premise equipment device via the selected licensed spectrum network, wherein the customer premise equipment device performs the one or more measurements via a first subscriber identification module (SIM) card and the customer premise equipment device transfers information via a second subscriber identification module (SIM) card.

26. A non-transitory computer readable medium comprising computer executable instructions which when executed by a processor cause the processor to perform operations comprising:
registering a customer premise equipment device with a spectrum access system;
informing the spectrum access system of a first data value and a second data value, the first data value specifying a count of subscriber identification module (SIM) cards and the second data value specifying a count of radios in the customer premise equipment device;
informing the spectrum access system of a frequency and an identity of a network to monitor;
performing, via the customer premise equipment device, one or more measurements based on the count of subscriber identification module (SIM) cards, the count of radios, the frequency and the identity of the network; and
sending the one or more measurements to a managing server.

* * * * *